US007376808B2

(12) United States Patent
Cascaval et al.

(10) Patent No.: US 7,376,808 B2
(45) Date of Patent: May 20, 2008

(54) METHOD AND SYSTEM FOR PREDICTING THE PERFORMANCE BENEFITS OF MAPPING SUBSETS OF APPLICATION DATA TO MULTIPLE PAGE SIZES

(75) Inventors: Gheorghe Calin Cascaval, Carmel, NY (US); Evelyn Duesterwald, New York, NY (US); Peter F. Sweeney, Spring Valley, NY (US); Robert W. Wisniewski, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 11/343,565

(22) Filed: Jan. 31, 2006

(65) Prior Publication Data

US 2007/0180215 A1 Aug. 2, 2007

(51) Int. Cl.
*G06F 9/34* (2006.01)
*G06F 12/00* (2006.01)
(52) U.S. Cl. ............... 711/207; 711/202; 711/203; 711/206; 703/13; 703/14; 703/21; 703/22
(58) Field of Classification Search .................. None
See application file for complete search history.

(56) References Cited

U.S. PATENT DOCUMENTS 5,937,437 A * 8/1999 Roth et al. ............... 711/202
6,751,583 B1 * 6/2004 Clarke et al. ............. 703/17
2005/0268039 A1 * 12/2005 Archambault et al. ...... 711/119

* cited by examiner

*Primary Examiner*—Donald Sparks
*Assistant Examiner*—Chad L Davidson
(74) *Attorney, Agent, or Firm*—Michael J. Buchenhorner; Douglas W. Cameron

(57) ABSTRACT

A method for modeling the performance of memory address translation mechanism (MATM), comprises: a) receiving an execution profile that contains a memory address reference stream of an application, a set of page size mappings, and events about the application's data allocations and de-allocations; b) translating each memory reference in the input memory reference stream into a reference to the corresponding data object, by consulting the memory allocation and de-allocation events, to provide a data object reference stream; c) translating each data object reference into a corresponding page reference by consulting the page size mapping and by modeling the data allocation and de-allocation events in accordance with the mapping to provide a page reference stream and a number of pages of each page size that are needed by the respective mapping; d) using the page reference stream to provide a stream of reuse distance values; e) determining, for each reference in the reuse distance value stream, whether the reference results in a hit or a miss reference to the MATM to provide the number of hits and the number of misses for each MATM; f) providing the hit and miss values to a cost model to estimate the number of miss cycles; g) ranking the mappings by their miss cycle values such that the mapping with the lowest number of miss cycles has the highest rank.

20 Claims, 2 Drawing Sheets

METHOD AND SYSTEM FOR PREDICTING THE PERFORMANCE BENEFITS OF MAPPING SUBSETS OF APPLICATION DATA TO MULTIPLE PAGE SIZES

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The present invention relates generally to computer memory subsystems and more particularly to such a memory subsystem organized into what is known in the art as a virtual memory. Still more particularly, the invention relates to an apparatus for modeling the performance of memory address translation mechanisms.

BACKGROUND OF THE INVENTION

Most hardware and operating systems support multiple memory page sizes. For example, the POWER4 architecture offers two page sizes: 4 Kilobyte pages (small pages) and 16 Megabyte pages (large pages), which are supported by AIX and Linux. The performance benefits of using large page sizes include reduced Translation Lookaside Buffer (TLB) misses and reduced page faults. On some computer architectures large pages may improve hardware prefetching if the prefetching mechanism extends to the large page scope. Large pages also provide a contiguous data layout in real memory which may benefit cache behavior and prefetching. However, the use of larger page sizes comes at a cost. There is an increase in fragmentation and an increase in memory footprint that may cause additional paging overhead in the operating system, especially in a multi-programmed environment. Further, large pages are typically pinned reducing the amount of pageable memory in the system.

Moreover, current interfaces in commercial operating systems and hardware have placed the burden on the end user to make the decision of which data objects in an application's data space to map to large pages, thus further limiting large page usability. For example, on the AIX operating system, memory has to be first partitioned into pools: a small- and large-page pool. The size of each pool must be determined by the user prior to running an application. End users can set a system environment variable or mark the application binary to indicate that they want to use large pages with an application. If large page usage is indicated, the entire data space (i.e., the static data and dynamic heap allocated data segments) is backed by large pages. Given these constraints, the decision of which portions of the application data space should be mapped to different page sizes is non-trivial.

An alternative, more selective, method to request large page memory on AIX is provided through allocating shared memory using the shmget system call with the large page flag enabled. The drawback of the first approach (environment variable and binary marking) is that it is an "all-or-nothing" approach; the entire data footprint must be backed by large pages. An all-or-nothing strategy is undesirable if only a small number of large pages is available, or in multi-programmed environments, where multiple applications are competing for the available large pages. The second shared memory strategy offers the ability to use large pages for only selected portions of the data space, thus allowing an application to be executed with reduced large page resources. However, the burden is on the programmer to identify the appropriate portions, which requires in-depth knowledge of the application's behavior and its data structures. To date, no reliable guideline exists for when to use large pages or which portions of the data space would benefit most from large pages. Due to these usage challenges, large pages, in spite of their potentially significant performance benefits, often remain unexploited in today's commercial systems.

There has been work at the operating system level on automatically using large pages. Romer et al. states that "good policies for superpages have been elusive because a cost benefit analysis is required to determine if the overhead of constructing a superpage is outweighed by its benefit". Their work, as well as more recent work, automatically migrate data from small pages to large pages reactively with analysis performed at the operating system level using data gathered by the system. The operating system, however, does not have enough knowledge of an application's data structures to selectively partition the application's data space. Furthermore, the system is only aware of the order that memory allocation requests are made and must make a decision based on that, while a higher-level mechanism can implement a predictive approach.

There has also been an exploratory approach to finding the best page size for more application data. This approach transparently explores all different page size options at runtime and then selects the best performing option as the final page size. This approach assumes that the entire data space of an application is moved to a different page size and does not address a hybrid page size allocation where the data space is partitioned into multiple sections of different page sizes.

Therefore, there is a need for a method and system that address the problem of working within a fixed budget of large pages or to determine the most beneficial subset of an application's data space to back with the available large pages.

SUMMARY OF THE INVENTION

A method for modeling the performance of a memory address translation mechanism (MATM), comprises: a) generating an execution profile that contains a memory address reference stream of an application, a set of page size mappings, and events about the application's data allocations and de-allocations; b) translating each memory reference in the input memory reference stream into a reference to a corresponding data object, by consulting the memory allocation and de-allocation events, to provide a data object reference stream; c) translating each data object reference into a corresponding page reference by consulting the page size mapping and by modeling the data allocation and de-allocation events in accordance with the mapping to provide a page reference stream and a number of pages of each page size that are needed by the respective mapping; d)

using the page reference stream to provide a stream of reuse distance values; e) determining, for each reference in the reuse distance value stream, whether the reference results in a hit or a miss reference to the MATM to provide the number of hits and the number of misses for each MATM; f) providing the hit and miss values to a cost model to estimate the number of miss cycles; and g) ranking the mappings by their miss cycle values such that the mapping with the lowest number of miss cycles has the highest rank.

DETAILED DESCRIPTION

Figure 2:
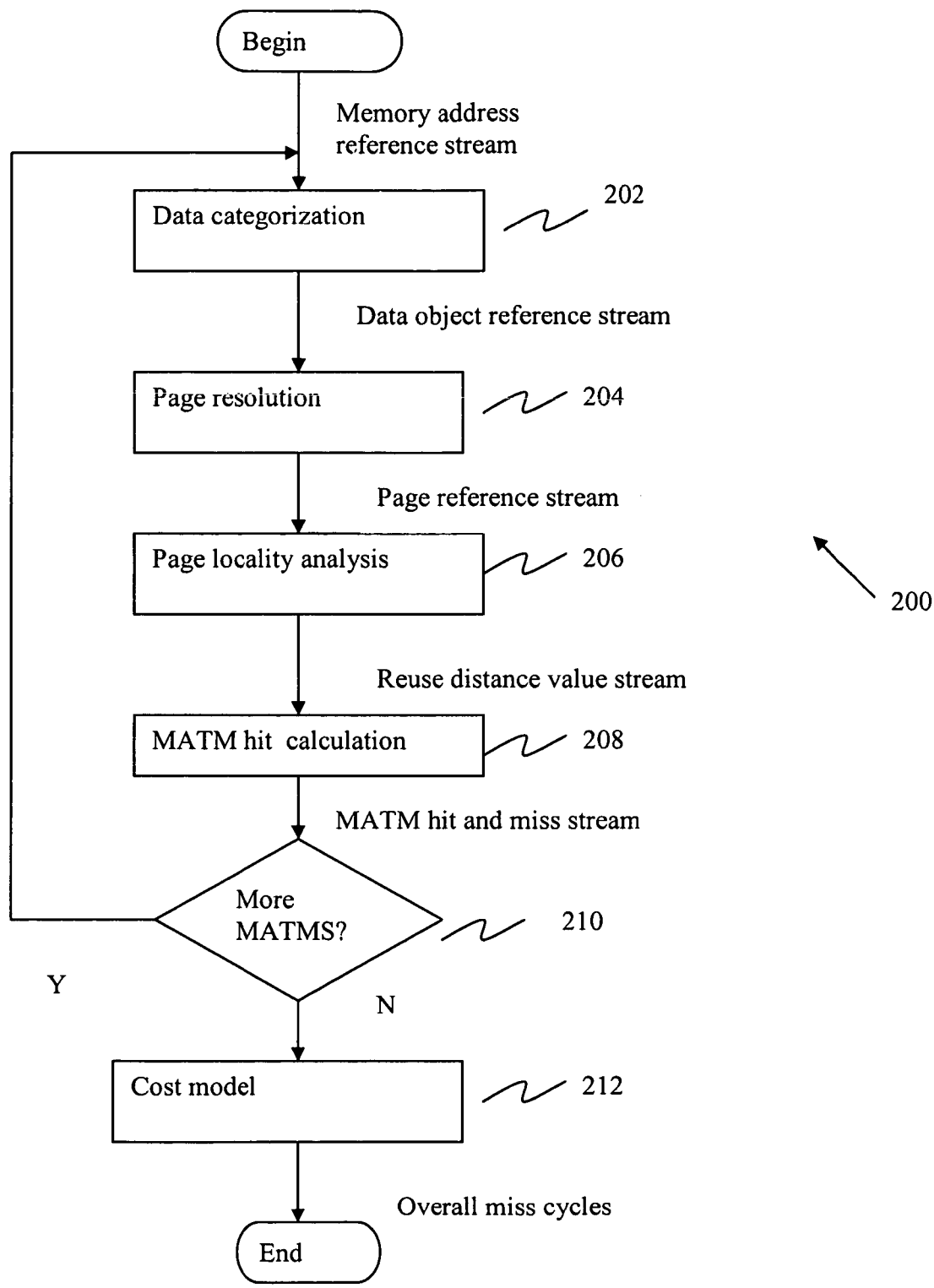
FIG. 2 depicts the individual modeling steps for predicting miss cycles for a given data memory address stream.

According to an embodiment of the invention, a method models the performance of memory address translation mechanisms (MATMs), such as a TLB (Translation Lookaside Buffer), while varying the memory page sizes of the application's data space. Performance of a MATM is measured in terms of miss cycles, which are the cycles that are needed to retrieve an address item that is currently not resident in the MATM. An embodiment of the invention finds a partitioning of the application's data space into areas of different page sizes that minimize the number of overall miss cycles with respect to all involved MATMs. The method proceeds by predicting the miss cycles for a set of page size mappings, where each page size mapping describes a specific partitioning of the application data to different page sizes. The method selects the mapping with the lowest predicted number of miss cycles for the currently available number of large pages. The modeling performed in order to make such a prediction is the core of this embodiment. The modeling process takes as input an execution profile that contains a memory reference stream of an application and events about the application's data allocations and de-allocations. Equivalently, an execution profile can be generated as a part of the modeling process. The modeling proceeds in several steps. During each step the memory reference stream is transformed into a new reference stream with the final stream being a stream of miss and hit values for each MATM. The transformation steps are illustrated in FIG. 2. Generally, the better the page locality for a given page size mapping, the lower its MATM miss cycles. At the end of the modeling, all considered page size mappings are ranked based on their miss cycle prediction and the number of large pages needed. In future executions of the application, the mapping that best meets the currently available large page resources can be selected to optimize performance and large page utilization.

Figure 1:
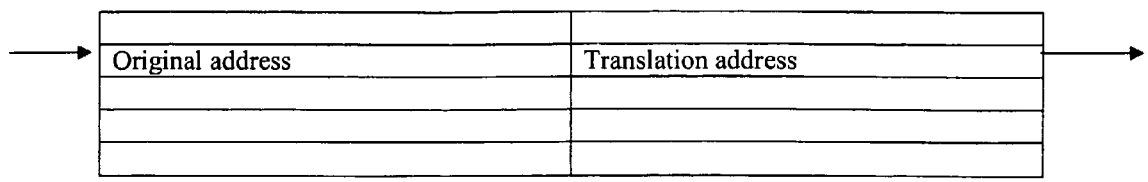
FIG. 1 illustrates the organization and use of a memory address translation mechanism (MATM).

Referring to FIG. 1 there is shown a block diagram of an MATM. In this example the MATM is a table that stores the original address mapped to a translated address. One example of this is the translation of a virtual address into its real address.

An embodiment, implemented on the AIX operating system, provides a method for modeling the performance of memory address translation mechanisms, such as a TLB, while varying memory page size. FIG. 1 illustrates the organization and operation of a typical TLB. We use the term memory address translation mechanism (MATM) to refer to any such mechanism in a computer system that takes as input a memory address at page size granularity and produces a translation for it. Other examples of MATMs in addition to the TLB are operating system page tables. MATMs are of finite size so that their performance can be characterized by their hit or miss rate for a given data reference stream. Consequently, the hit and miss rates of an MATM are directly affected by a change in page size. The larger the page size, the fewer pages are needed to cover an address range and the fewer MATM misses result for a given address stream. Each MATM has a finite number of entries. The number of entries, the organization of the MATM, and most importantly the locality of the access patterns in the reference stream determines whether each access results in either a hit or a miss.

An objective of the invention is to produce a partitioning of an application's data into different page sizes, such that the MATM miss rate for a given data reference stream for a given number of available large pages is minimized. A data space partitioning is described by a page size mapping, which is a mapping from the set of all data objects in the application to a set of memory pages. The model described in this invention takes a set of page size mappings and predicts the relative performance benefits with respect to a set of MATMs in the computer system for each mapping in the set. For each mapping the model also determines the number of large pages needed.

In addition to a set of page size mappings, a method of an embodiment of the invention takes as input a profile from a run of the application in which all data structures are mapped to small pages. The profile consists of (1) events for the allocation of static data, (2) events for each dynamic allocation and de-allocation of memory, and (3) memory reference events. Static data allocation events include the size of each static data segment and the address at which the segment was allocated. This information can typically be found in the application binary. A dynamic allocation event includes a timestamp, the size of the requested memory, and the address at which the requested memory was allocated in the profile run. A dynamic de-allocation event includes a timestamp and the address at which the de-allocated data was previously allocated. Dynamic data allocation and deallocation events may be generated by instrumenting the dynamic memory library (i.e., the malloc library on UNIX-based operating systems). A memory reference event contains a timestamp and the memory address of the referenced location. The memory references in the profile may represent the complete memory address stream of the application or a sampled subset of the complete memory address stream. Memory reference events can be generated through hardware counters or instrumentation of the application code.

Referring to FIG. 2, a method 200 according to an embodiment of the invention takes a profile as input and performs the modeling as part of an offline analysis of the profile. The analysis proceeds in several rounds. Each round models the performance of the memory address translation mechanisms for one of the input page size mappings. The modeling proceeds in the following steps, where each step transforms the original memory address stream into a new reference stream:

Data categorization: In step 202 the memory reference in the input memory reference stream is translated into a reference to the corresponding data object by consulting the memory allocation and de-allocation events. The result is a data object reference stream.

Page resolution: In step 204 each data object reference is translated into a corresponding page reference by consulting the current round's page size mapping and by modeling data allocation and de-allocation events in accordance with the mapping. The result is a page reference stream. The modeling of the data allocation and de-allocation also produces the number of pages of each page size that are needed by the respective mapping.

Page locality analysis: In step 206 the page reference stream is used to compute a reuse distance histogram. The reuse distance of address reference "r" in a stream of references is defined as the number of distinct references between two accesses to the same address, or infinity if there is no previous access. For example, in the reference stream "a b c c a", the reuse distance for the first access of "a" is infinity because "a" has not be accessed yet and the reuse distance for the second access of "a" is 2. This step is repeated for each MATM by processing the page references that access the specific MATM. The result is a stream of reuse distance values.

MATM hit and miss rates: In step 208 for each reference in the reuse distance value stream it is determined whether the reference results in a hit or a miss reference to the MATM. This determination is done by making certain assumptions on the organization of the MATM, namely that it is organized as a fully-associative memory, that it has "E" entries, and that entries are replaced in the MATM in LRU (i.e., Least Recently Used) order. Based on these assumptions, the reference to an MATM results in a hit if its reuse distance value is smaller than or equal to "E". Conversely, the reference results in a miss if its reuse distance value is greater than "E". This step is repeated for each MATM. The result of this step is the determination of the number of hits and the number of misses for each MATM.

In decision 210 the system determined whether there are any other MATMs to process. If there are, the system returns to the beginning. If there are no more the process either terminates or other steps can be performed.

Cost Model: In step 212 the hit and miss values for each given page size mapping "M" are next fed into a cost model to estimate the number of miss cycles. The cost model is specific to a memory hierarchy implementation in a computer system, so that the constants and details of the cost model may differ from one memory hierarchy architecture to the next. However the overall form of the cost model is common across architectures, and described as follows: First, the miss cycles for a particular MATM are determined as the number of misses for that MATM times the cost of each miss in computer cycles. The cost of each miss can be experimentally determined for a given implementation of that MATM. The overall number of miss cycles results as the sum over the miss cycles for each MATM.

After all rounds have completed, the analysis has determined, for each page size mapping, the estimated number of miss cycles and the number of pages of each size needed to satisfy the mapping. The different mappings can then be ranked by their miss cycle values, so that the mapping with the lowest number of miss cycles has the highest rank. The ranking, along with the page size requirements for each mapping, is stored as a directive in a file associated with the application that produced the initial profile.

In future executions of the application the directives file can be consulted to determine the best page size mapping given the number of currently available large pages. The determined number of large pages needed for each mapping is completely accurate only if the application is executed with the same input that was used to produce the profile. To use the directives across different inputs of the applications, the sizing information contained in the directives may be scaled according to the scaling of the inputs.

The page size mapping selection and implementation can be performed, for example, through a custom dynamic memory allocation library that maintains several memory heaps, one for each page size, and that partitions the dynamic memory allocation requests from the application according to the selected page size mapping.

Although in this embodiment, the input page size mapping maps all data objects to small pages and the execution profile reflects this mapping, the invention is not limited in this way. The invention works correctly with any page size mapping and a corresponding execution profile that reflects the mapping.

In this embodiment, the data mapping to pages is fixed throughout the duration of an application's execution. However, the invention is not limited to a fixed partition, but could re-partition a data space during the application's execution; for example, at garbage collection times.

Figure 3:
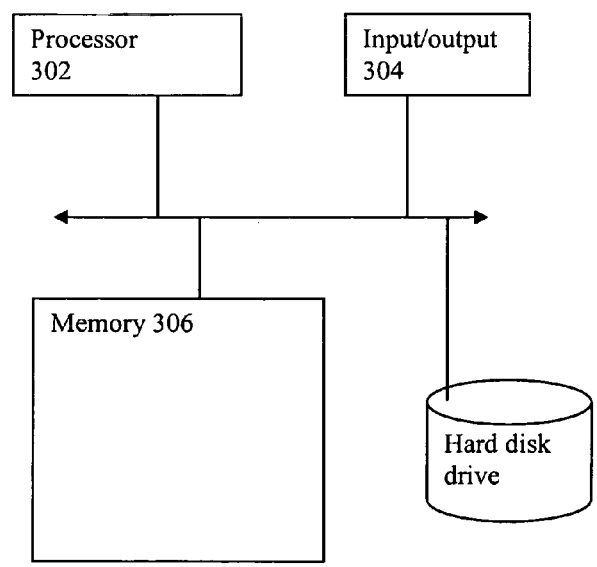
FIG. 3 is a simplified block diagram of an information processing system embodying the invention.

Referring to FIG. 3, in another embodiment, the invention can be implemented as a programmable computer 300 comprising an input/output subsystem 304 that can be configured to receive the input to the method 200, a processor 302 that can be configured to perform the method 200 and a memory 306 that can hold the various pages and the MATM.

Therefore, while there has been described what is presently considered to be the preferred embodiment, it will be understood by those skilled in the art that other modifications can be made within the spirit of the invention.

We claim:

1. A method for modeling the performance of a memory address translation mechanism (MATM) while varying the memory page sizes of the application's data space, comprising:
   a) generating an execution profile that contains a memory address reference stream of an application, and events about the application's data allocations and de-allocations;
   b) generating a set of page size mappings;
   c) translating each memory reference in the input memory reference stream into a reference to a corresponding data object, by consulting the memory allocation and de-allocation events, to provide a data object reference stream;
   d) translating each data object reference into a corresponding page reference by consulting the page size mapping and by modeling the data allocation and de-allocation events in accordance with the mapping to provide a page reference stream and a number of pages of each page size that are needed by the respective mapping;
   e) using the page reference stream to provide a stream of reuse distance values;
   f) determining, for each reference in the reuse distance value stream, whether the reference results in a hit or a miss reference to the MATM to provide the number of hits and the number of misses for each MATM; and
   g) providing the hit and miss values to a cost model to estimate the number of miss cycles.

2. The method of claim 1 further comprising a step of h) ranking the mappings by their miss cycle values such that the mapping with the lowest number of miss cycles has the highest rank.

3. The method of claim 1, further comprising producing a partitioning of an application's data into different page sizes, such that the MATM miss rate for a given data reference stream and a given number of available large pages is minimized.

4. The method of claim 1, where the method performs the modeling as part of an offline analysis of the profile.

5. The method of claim 1, further comprising selecting a mapping with the lowest predicted number of miss cycles for currently available number of large pages.

6. The method of claim 1, wherein the memory address translation mechanism is a translation lookaside buffer.

7. The method of claim 1, wherein the memory address translation mechanism is an operating system page table.

8. The method of claim 1, wherein step e) is repeated for each MATM by processing the page references that access the specific MATM.

9. The method of claim 1, wherein the determination of step e) is done by making certain assumptions on the organization of the MATM, namely that it is organized as a fully-associative memory.

10. The method of claim 1, wherein the cost model is specific to a memory hierarchy implementation, so that the constants and details of the cost model may differ from one memory hierarchy architecture to the next.

11. The method of claim 1, wherein the miss cycles for a particular MATM are determined as the number of misses for that MATM times the cost of each miss in computer cycles.

12. The method of claim 1, wherein the cost of each miss is experimentally determined for a given implementation of that MATM.

13. The method of claim 1, wherein the method uses the directives across different inputs of applications, and the sizing information contained in the directives is scaled according to the scaling of the inputs.

14. The method of claim 1, wherein the page size mapping selection and implementation is performed through a custom dynamic memory allocation library that maintains several memory heaps, one for each page size, and that partitions the dynamic memory allocation requests from the application according to the selected page size mapping.

15. The method of claim 1, wherein the input page size mapping maps all data objects to small pages and the execution profile reflects this mapping.

16. The method of claim 1, wherein the data mapping to pages is fixed throughout the duration of an application's execution.

17. The method of claim 1, wherein the data mapping to pages is fixed throughout the execution of the application.

18. The method of claim 17, wherein the method re-partitions a data space during the application's execution.

19. The method of claim 1, further comprising storing the ranking with the page size requirements for each mapping as directives in a file associated with the application that produced the execution profile.

20. The method of claim 1, wherein the method performs the modeling as part of the profile.

* * * * *